United States Patent
De Pena et al.

(10) Patent No.: US 10,730,282 B2
(45) Date of Patent: Aug. 4, 2020

(54) TEMPERATURE CORRECTION VIA PRINT AGENT APPLICATION

(71) Applicant: HEWLETT-PACKARD DEVELOPMENT COMPANY, L.P., Houston, TX (US)

(72) Inventors: Alejandro Manuel De Pena, Sant Cugat del Valles (ES); Sergio Puigardeu Aramendia, Corvallis, OR (US); David Ramirez Muela, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/094,187

(22) PCT Filed: May 12, 2016

(86) PCT No.: PCT/EP2016/060702
§ 371 (c)(1),
(2) Date: Oct. 16, 2018

(87) PCT Pub. No.: WO2017/194124
PCT Pub. Date: Nov. 16, 2017

(65) Prior Publication Data
US 2019/0126607 A1 May 2, 2019

(51) Int. Cl.
*B33Y 10/00* (2015.01)
*B29C 64/165* (2017.01)
(Continued)

(52) U.S. Cl.
CPC .............. *B33Y 50/02* (2014.12); *B29C 41/46* (2013.01); *B29C 41/52* (2013.01); *B29C 64/165* (2017.08);
(Continued)

(58) Field of Classification Search
CPC ....... B29C 41/46; B29C 41/52; B29C 64/165; B29C 64/386; B29C 64/393; B33Y 10/00; B33Y 30/00; B33Y 50/02
See application file for complete search history.

(56) References Cited

U.S. PATENT DOCUMENTS 7,073,442 B2    7/2006  Fedor et al.
7,261,542 B2 *  8/2007  Hickerson ............. B33Y 10/00
                                                   425/174.4
(Continued)

FOREIGN PATENT DOCUMENTS

WO    WO-2015108546 A2    7/2015
WO    WO-2015108560 A1    7/2015
(Continued)

OTHER PUBLICATIONS

Hu, et al; "Modelling and Measuring the Thermal Behaviour of the Molten Pool in Closed-Loop Controlled Laser-Based Additive Manufacturing"; Jul. 16, 2012.

*Primary Examiner* — Kidest Bahta
(74) *Attorney, Agent, or Firm* — HP Inc. Patent Department

(57) ABSTRACT

In an example, a method includes forming, at an additive manufacturing apparatus, a first layer of build material to be processed in the generation of an object. A print agent is selectively applied onto the first layer based on a first print instruction associated with the first layer. Energy is applied to the first layer to cause fusion in a region of the first layer. The method further comprises: measuring the temperature of the first layer at a plurality of locations to form a measured temperature distribution profile; comparing the measured temperature distribution profile against a predicted temperature distribution profile to generate a difference; and correcting a temperature distribution profile of a subsequent layer of the build material following fusion of the subse-
(Continued)

quent layer based on the difference by modifying a second print instruction associated with the subsequent layer.

20 Claims, 3 Drawing Sheets

(51) Int. Cl.
*B33Y 50/02* (2015.01)
*B29C 64/386* (2017.01)
*B29C 64/393* (2017.01)
*B29C 41/46* (2006.01)
*B29C 41/52* (2006.01)
*B33Y 30/00* (2015.01)

(52) U.S. Cl.
CPC .......... *B29C 64/386* (2017.08); *B29C 64/393* (2017.08); *B33Y 10/00* (2014.12); *B33Y 30/00* (2014.12)

(56) References Cited

U.S. PATENT DOCUMENTS

| | | |
|---|---|---|
| 8,535,036 B2 | 9/2013 | Hopkinson et al. |
| 2007/0241482 A1 | 10/2007 | Giller et al. |
| 2015/0201500 A1* | 7/2015 | Shinar .................... H05K 3/125 |
| | | 425/132 |

FOREIGN PATENT DOCUMENTS

| | | |
|---|---|---|
| WO | WO-2015136278 | 9/2015 |
| WO | WO-2015167520 | 11/2015 |

\* cited by examiner

TEMPERATURE CORRECTION VIA PRINT AGENT APPLICATION

BACKGROUND

Additive manufacturing techniques may generate a three-dimensional object on a layer-by-layer basis through the solidification of a build material. In examples of such techniques, build material is supplied in a layer-wise manner and a solidification method may include heating the layers of build material to cause melting in selected regions. In other techniques, other solidification methods, such as chemical solidification methods or binding materials, may be used.

BRIEF DESCRIPTION OF DRAWINGS

Non-limiting examples will now be described with reference to the accompanying drawings, in which.

DETAILED DESCRIPTION

Additive manufacturing techniques may generate a three-dimensional object through the solidification of a build material. In some examples, the build material may be a powder-like granular material, which may for example be a plastic, ceramic or metal powder. The properties of generated objects may depend on the type of build material and the type of solidification mechanism used. Build material may be deposited, for example on a build platform and processed layer by layer, for example within a fabrication chamber.

In some examples, selective solidification is achieved through directional application of energy, for example using a laser or electron beam which results in solidification of build material where the directional energy is applied. In other examples, at least one print agent may be selectively applied to the build material. For example, a coalescing agent (referred to hereinafter as a 'fusing agent') may be selectively distributed onto portions of a layer of build material in a pattern derived from data representing a slice of a three-dimensional object to be generated (which may for example be generated from structural design data). The coalescing agent may have a composition such that, when energy (for example, heat) is applied to the layer, the build material coalesces (fuses) and solidifies to form a slice of the three-dimensional object in accordance with the pattern. In other examples, coalescence may be achieved in some other manner.

In addition to a fusing agent, in some examples, a print agent may also comprise a coalescence modifying agent (referred to hereinafter as a 'detailing agent') which acts to reduce or amplify the fusion action. For example, the detailing agent may reflect incident energy so as to prevent fusion of the build material. Detailing agents may be used to control the surface finish of the object.

As noted above, additive manufacturing systems may generate objects based on structural design data. This may involve a designer generating a three-dimensional model of an object to be generated, for example using a computer aided design (CAD) application. The model may define the solid portions of the object. To generate a three-dimensional object from the model using an additive manufacturing system, the model data can be processed to generate slices of parallel planes of the model. Each slice may define a portion of a respective layer of build material that is to be solidified or caused to coalesce by the additive manufacturing system.

Figure 1:
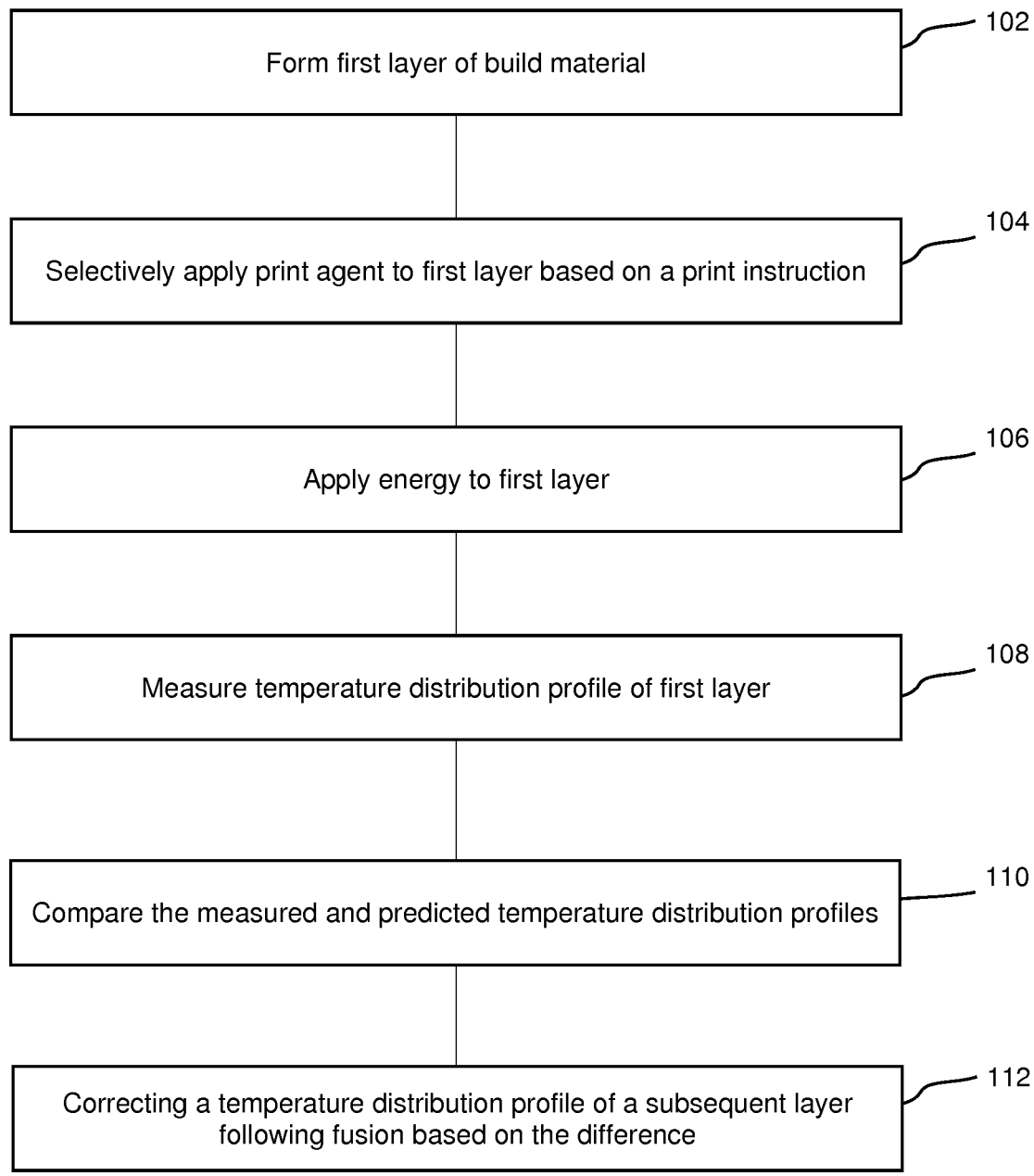
FIG. 1 is a flowchart of an example method of determining a print instruction for applying print agent.

FIG. 1 is an example of a method, which may be a method of additive manufacturing, comprising, in block 102, forming, at an additive manufacturing apparatus, a first layer of build material to be processed in the generation of an object. For example, a layer of build material may be provided on a build platform, either directly or overlaid on at least one previously formed layer (and in some examples, the previously formed layer may have been processed by the application of at least one print agent, and irradiated with energy from an energy source, for example, a heat lamp). In some examples, the layer of build material may be preheated to a preheating temperature which is below a fusion temperature. For example, an array of preheating lamps may be provided over the build platform which heat the build material to the preheating temperature. The preheating temperature is below the fusion temperature of the build material such that the build material does not fuse. However, by preheating the build material, the additional energy required in order to raise the temperature of the build material from the preheating temperature to the fusion temperature in order to fuse the build material is reduced. The array of preheating lamps may operate uniformly such that they each output the same power in order to ensure that the build material within the layer is at a homogeneous temperature. The power output by the preheating lamps may be controlled using pulse-width modulation (PWM) which is set to provide the desired level of preheating. The preheating setting may therefore be a duty cycle of the preheating lamps.

Block 104 comprises selectively applying a print agent onto the first layer based on a first print instruction associated with the first layer. For example, this may be according to a predetermined pattern, which may be a pattern derived from object model data representing an object to be generated by an additive manufacturing apparatus by fusing a build material. Such object model data may for example comprises a Computer Aided Design (CAD) model, and/or may for example be a STereoLithographic (STL) data file, and may for example specify a material distribution (e.g. identifying the solid portions) in a 'slice' of the object.

Block 106 comprises applying energy to the first layer of build material, for example using an energy source, to raise the temperature of the build material beyond the fusion temperature over a portion of the layer so as to fuse a region of the first layer. This may for example comprise applying heat, for example using a heat lamp, to the layer of build material, or irradiating the layer with light, microwave energy or the like.

Block 108 comprises measuring the temperature of the first layer at a plurality of locations. In some examples, the temperature measurements are taken over fused and unfused regions of the layer. The plurality of temperature measurements may be considered to form a temperature distribution profile. For example, a layer of build material may be considered as a plurality of pixels, and each of a plurality of the pixels may be associated with a temperature measurement. In one example, the pixels may be in the order of 1-2 cm in length, dividing a build platform of around 30 cm by 30 cm into around a 32×32 matrix of pixels, although larger or smaller pixels could be formed. In some examples, the temperature of the first layer may be measured following processing thereof. In some examples, a subsequent layer of build material may be formed, for example overlying the agent treated and at least partially fused first layer, and the temperature of that subsequent layer may be measured, for example before any print agent is applied thereto. The temperature may be measured using any type of temperature sensor(s). In some examples the temperature may be measured using a thermal imaging camera, or an Infra-red (IR) camera.

Block 110 comprises comparing the measured temperature distribution profile against a predicted temperature distribution profile to generate a difference.

Block 112 comprises correcting a temperature distribution profile of a subsequent layer of build material following fusion of the subsequent layer based on the difference by modifying a second print instruction associated with the subsequent. In some examples, the second print instruction is predetermined and is generated based on a predictive calculation. The predictive calculation may determine the amount of fusing agent and detailing agent which should be applied to the build material in order to achieve the desired temperatures during fusion. For example, the predictive calculation may take into account the distance of the layer from the energy source and an estimation of heat diffusion from the object during fusion. The predictive calculation therefore determines the amount of fusing agent and detailing agent which should be applied to each area (i.e. pixel/voxel) of the layer in order to provide proper fusion over fused regions, while maintaining the build material below the fusion temperature in other, unfused regions. In some examples, the predictive calculation may determine the quantity of print agent so as to provide a uniform temperature over at least the fused regions. The predetermined print instruction may also include information regarding the order in which print agent is applied to the layer and the type and composition of the print agent to be applied to the layer.

The thermal behaviour of the layers of build material in object generation may depart from the modelled behaviour, for example due to variations in the thermal properties of the build material and/or print agents used (for example, build material may be recycled, and the thermal properties thereof may change over its life), environmental conditions (including ambient temperature and humidity), an incomplete model or the like. Accordingly, the initial set of print instructions may result in defects in the printed object such as unintended physical properties like brittleness, loss of strength, loss of dimensional accuracy and/or increased roughness, or variations in the appearance of an object due to overheating/under heating during object formation. The predetermined print instructions for applying print agent to the subsequent layer may therefore be modified based on the measured temperatures for the first layer, as described above.

For example, if an area of the previous layer has a higher temperature than anticipated, then the energy required in order to cause fusion of the subsequent may be lower. This can lead to overheating of the build material. Accordingly, the print instruction for the subsequent layer may be modified to take into account the difference in temperature in order to correct the temperature of the subsequent layer following fusion. For example, in this situation, the amount of fusing agent applied to this area of the subsequent layer may be reduced so that it does not absorb as much energy from the energy source, thereby offsetting the increased temperature of the previous layer. In contrast, if an area of the previous layer has a lower temperature than anticipated, then the amount of fusing agent may be increased so that more energy is absorbed so as to ensure proper fusion of the subsequent layer. The amount of detailing agent may also be controlled in response to the measured temperatures. The amount of energy absorbed may be controlled in other ways instead of changing the amount of print agent. For example, the concentration, type or composition of the print agent may be modified.

The print agent application may be controlled based on a comparison of the measured temperature versus a predetermined temperature and using a suitable control method such as Proportional-Integral-Derivative (PID) control, machine learning algorithms, proportional control, etc.

Comparing the measured temperature distribution profile with a modelled temperature distribution profile may be achieved by comparing temperatures of spatially aligned pixels.

In some examples, the subsequent layer may be treated as the first layer in FIG. 1 following fusion, and the method may be carried out in relation to each, or at least some, of the layers formed in additive manufacturing.

Figure 2A:
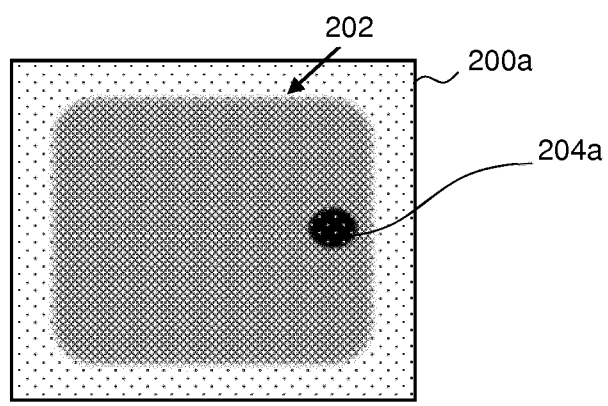
FIGS. 2a-2c are schematic diagrams of example thermal/printing maps.

FIG. 2*a* shows an example of temperature measurements over the surface of a layer of build material as a 'thermal map' 200*a*. Such a map may represent a plurality of imaging pixels, each of which is associated with a temperature measurement. In FIG. 2*a*, a higher temperature is indicated as a darker region, and a lower temperature is indicated as a lighter region.

FIG. 2*a* shows a thermal map 200*a* of a layer of build material which has been treated with fusing agent and heated with a heat lamp. For the purposes of this example, an object being formed in this layer comprises a rounded rectangle cross-section 202. As is shown by the darker region, the layer of build material is hotter over a portion 204 of the rectangle. It may be expected that the temperature following fusion of the layer would be uniform across the rectangle and this hotter portion 204 may be a departure from the anticipated temperatures. The hotter portion 204 may be a result of some abnormality, such as a discrepancy in the preheating lamps, energy source or build material, or any other reason. The temperature of the surrounding unfused build material is lower than in the fused region. It should be noted that, in practise, there may be more variation in temperature, which is not shown in the figures to avoid overcomplicating them. As a result of the higher temperature in the portion 204, a subsequent layer may fuse more readily which can again lead to higher temperatures and a thermal runaway condition.

Figure 2B:
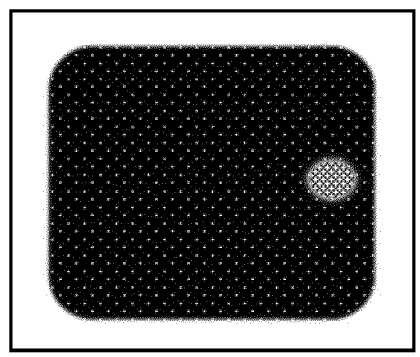

FIG. 2*b* shows a printing map which depicts the application of a fusing agent onto a subsequent layer of build material formed on top of the first layer shown in FIG. 2*a*. In this Figure, a darker region indicates a larger amount of fusing agent (lower volume per pixel/voxel) and a lighter region indicates a smaller amount of fusing agent. As shown, over the hotter portion 204 shown in FIG. 2*a*, a smaller amount of fusing is applied. By applying a smaller amount of fusing agent over the hotter portion 204, less energy is absorbed by the subsequent layer during fusion such that the temperature increase is reduced. The application of the fusing agent is therefore used to offset the temperature variation.

Figure 2C:
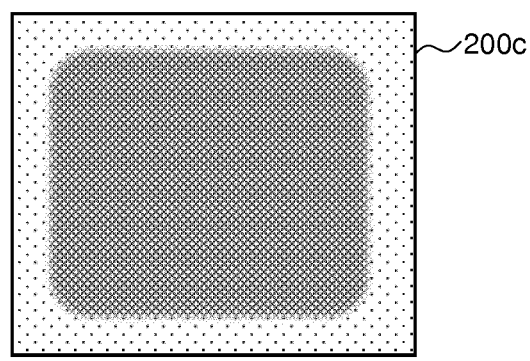

FIG. 2*c* shows a thermal map 200*c* following fusion of the subsequent layer. As shown, the reduction of fusing agent over the hotter portion 204 offsets the increased temperature such that the fused region has a uniform temperature.

As described previously, the application of print agent may be controlled in other ways in order to provide localised temperature control. The resulting temperature also need not be uniform over the fused region and different temperature profiles may be chosen.

Figure 3:
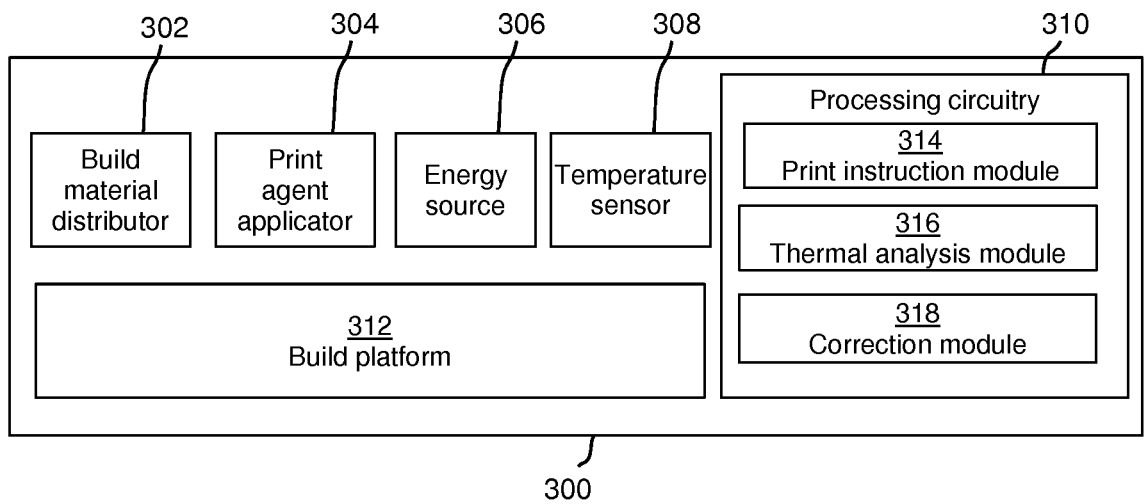
FIG. 3 is a simplified schematic drawing of an example additive manufacturing apparatus.

FIG. 3 is an example of an additive manufacturing apparatus 300 comprising a build material distributor 302, a print agent applicator 304, an energy source 306, a temperature sensor 308 and processing circuitry 310. A build platform 312, which may be a removable component (for example being provided as part of a trolley), may be provided in use of the additive manufacturing apparatus 300 to support a layer of build material. The build material distributor 302 may form successive layers of build material on the build platform 312 in a layer-wise additive manufacturing process. For example, the build material distributor 302 may comprise a roller to spread build material across the build platform 312. In some examples, a removable component on which the build platform 312 is provided may also comprise a source of build material, and may comprise a mechanism to lift the build material and prepare it so the build material distributor 302 can spread the build material on the build platform 312.

The print agent applicator 304 may be controlled to selectively print a print agent onto a layer of build material on the build platform 312, for example according to a predetermined pattern contained in a print instruction for the layer of build material. For example, the print agent applicator 304 may comprise a print head, such as an ink jet print head, and may apply the print agent(s) as a liquid, for example in one or more passes over the build platform 312.

In some examples, a preheating device may be provided to preheat the layer of build material to a preheating temperature which is below a fusion temperature. For example, the preheating device may comprise an array of preheating lamps which are provided over the build platform to heat the build material to the preheating temperature.

The energy source 306, which may be a heat lamp, raises the temperature of the build material beyond the fusion temperature over a portion of the layer so as to cause fusion in at least a region of the layer.

The temperature sensor 308, which may be a thermal camera, a thermal imaging array or the like, measures the temperature of the layer at a plurality of locations to form a measured temperature distribution profile. In some examples, the temperature sensor 308 may measure the temperature at a plurality of locations within fused and unfused regions.

The processing circuitry 310 comprises a print instruction module 314, a thermal analysis module 316 and a correction module 318. The print instruction module 314 is configured to generate the print instructions for each layer of build material. For example, the print instruction module 314 may predetermine the print instruction based on a predictive calculation. The predictive calculation may determine the amount of fusing agent and detailing agent which should be applied to the build material in order to achieve the desired temperatures during fusion. For example, the predictive calculation may take into account the distance of the layer from the energy source and an estimation of heat diffusion from the object during fusion. The predictive calculation therefore determines the amount of fusing agent and detailing agent which should be applied to each area (i.e. pixel/voxel) of the layer in order to provide proper fusion over fused regions, while maintaining the build material below the fusion temperature in other, unfused regions. In some examples, the predictive calculation may determine the quantity of print agent so as to provide a uniform temperature over at least the fused regions. The print instruction may also include information regarding the order in which print agent is applied to the layer and the type and composition of the print agent to be applied to the layer.

The thermal analysis module 316 is configured to compare the measured temperature distribution profile provided by the temperature sensor 308 against a predicted temperature distribution profile to generate a difference. In response to this comparison, the correction module 318 is configured to correct a temperature distribution profile of a subsequent layer of build material following fusion of the subsequent layer based on the difference by modifying a second print instruction associated with the subsequent layer. In some examples, the correction module 318 may change the amount of print agent, particularly fusing agent or detailing agent, prescribed by the predetermined print instructions in order to offset the difference between the measured temperature and the predicted temperature. Such a change may be over only a portion of a fused or unfused region of the layer.

The temperature sensor 308 may also be used in controlling other aspects of the apparatus, for example to determine a preheating setting (e.g. duty cycle) for preheating lamps or to determine when a generated object is cooled. The temperature sensor 308 may be further used to measure the temperature of other parts of an additive manufacturing apparatus, for example a temperature of a spittoon, a web wipe or of a drop detector.

Figure 4:
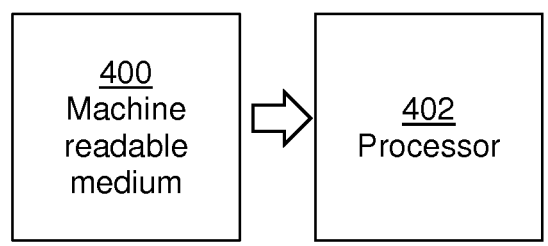
FIG. 4 is a simplified schematic drawing of an example processor associated with a machine readable medium.

FIG. 4 is an example of a machine readable medium 400 associated with a processor 402. The machine readable medium 400 comprises instructions which, when executed by the processor 402, cause the processor 402 to compare a measured temperature distribution profile against a predicted temperature distribution profile for a layer of build material in a layer-wise additive manufacturing process; and modify a print instruction for applying print agent onto a subsequent layer of build material based on the difference between the measured temperature distribution profile and the predicted temperature distribution profile of a previous layer so as to provide a correction of the temperature distribution profile of the subsequent layer following fusion.

In some examples, the print instructing is modified by changing an amount of print agent, e.g. fusing agent and/or detailing agent, applied onto the subsequent layer.

The print instruction may be generated based on a predictive thermal model for the object being formed. The measured temperatures may be compared with predicted temperatures and deviations from the predicted temperatures used to make adjustments to the print instruction.

In some examples, adjustment of the print instruction may be determined using a threshold based method or a more complex method such as a proportional-integral-derivative (PID) control based calculation or by following a statistical approach (for example based on machine learning).

Examples in the present disclosure can be provided as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules of the apparatus may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:
    forming, at an additive manufacturing apparatus, a first layer of build material to be processed in the generation of an object;
    selectively applying a print agent onto the first layer based on a first print instruction associated with the first layer;
    applying energy to the first layer to cause fusion in a region of the first layer;
    measuring the temperature of the first layer at a plurality of locations to form a measured temperature distribution profile;
    comparing the measured temperature distribution profile against a predicted temperature distribution profile to generate a difference; and
    correcting a temperature distribution profile of a subsequent layer of build material following fusion of the subsequent layer based on the difference by modifying a second print instruction associated with the subsequent layer.

2. A method according to claim 1, wherein modifying the application of the print agent comprises changing an amount of print agent applied to the subsequent layer.

3. A method according to claim 1, wherein the print agent comprises a fusing agent, a detailing agent, or a combination thereof.

4. A method according to claim 1, wherein the temperature of the first layer is measured within a fused region of the first layer and within an unfused region of the first layer.

5. A method according to claim 1, wherein the second print instruction is generated based on a predicted temperature of the object and is then modified based on the difference.

6. A method according to claim 1, wherein the temperature profile of the subsequent layer following fusion is corrected to have a uniform temperature over a fused region of the subsequent layer.

7. An additive manufacturing apparatus comprising:
    a build material distributor to form a plurality of layers of build material on a build platform to be processed in the generation of an object;
    a print agent applicator to selectively apply print agent onto the build material based on print instructions associated with the plurality of layers;
    an energy source to cause fusion in a region of a first layer of the plurality of layers;
    a temperature sensor to measure the temperature of the first layer at a plurality of locations to form a measured temperature distribution profile; and
    processing circuitry comprising:
        a print instruction module to generate the print instructions;
        a thermal analysis module to compare the measured temperature distribution profile against a predicted temperature distribution profile to generate a difference; and
        a correction module to correct a temperature distribution profile of a subsequent layer of build material following fusion of the subsequent layer based on the difference by modifying a second print instruction associated with the subsequent layer.

8. An additive manufacturing apparatus according to claim 7, wherein the temperature sensor comprises a thermal imaging camera.

9. An additive manufacturing apparatus according to claim 7, wherein the correction module is to modify the second print instruction by changing an amount of print agent applied to the subsequent layer.

10. An additive manufacturing apparatus according to claim 7, wherein the print agent applicator is to apply a fusing agent, a detailing agent, or a combination thereof onto the build material of the layer.

11. An additive manufacturing apparatus according to claim 7, wherein the temperature sensor is to measure the temperature of the layer within a fused region and within an unfused region.

12. An additive manufacturing apparatus according to claim 7, wherein the print instruction module is to generate a distinct print instruction for each layer of the build material based on a predicted temperature of the object.

13. A machine readable medium comprising instructions which, when executed by a processor, cause the processor to:
  compare a measured temperature distribution profile of a layer of build material against a predicted temperature distribution profile of the layer to generate a difference in a layer-wise additive manufacturing process; and
  modify a print instruction to apply a print agent onto a subsequent layer of build material based on the difference to correct the temperature distribution profile of the subsequent layer following fusion.

14. A machine readable medium according to claim 13, wherein modifying the print instruction comprises changing an amount of the print agent applied onto the subsequent layer.

15. A machine readable medium according to claim 13, wherein the print agent comprises a fusing agent, a detailing agent, or a combination thereof.

16. A method of claim 1, wherein correcting a temperature distribution profile of a subsequent layer further comprises:
  adjusting amounts of print agent to be deposited according to the second print instruction associated with the subsequent layer, the adjusting of amounts of print agent being based on the difference between the measured temperature distribution profile and predicted temperature distribution profile of the first layer.

17. A method of claim 1, wherein correcting a temperature distribution profile of a subsequent layer further comprises:
  adjusting amounts of a detailing agent to be deposited, in addition to the print agent, according to the second print instruction associated with the subsequent layer, the adjusting of amounts of detailing agent being based on the difference between the measured temperature distribution profile and predicted temperature distribution profile of the first layer.

18. A method of claim 1, further comprising determining the predicted temperature distribution profile based on a distance of the first layer from an energy source for causing fusion of build material treated with coalescing agent and an estimate of heat diffusion from the first layer during fusion.

19. An additive manufacturing apparatus according to claim 7, wherein the correction module is to correct the temperature distribution profile of a subsequent layer by adjusting amounts of print agent to be deposited according to the second print instruction associated with the subsequent layer, the adjusting of amounts of print agent being based on the difference between the measured temperature distribution profile and predicted temperature distribution profile of the first layer.

20. An additive manufacturing apparatus according to claim 7, wherein the correction module is to correct the temperature distribution profile of a subsequent layer by adjusting amounts of a detailing agent to be deposited, in addition to the print agent, according to the second print instruction associated with the subsequent layer, the adjusting of amounts of detailing agent being based on the difference between the measured temperature distribution profile and predicted temperature distribution profile of the first layer.

* * * * *